(12) United States Patent  
Hirayama

(10) Patent No.: US 7,054,036 B2  
(45) Date of Patent: May 30, 2006

(54) IMAGE PROCESSING METHOD AND IMAGE FORMING APPARATUS

(75) Inventor: Masatsugu Hirayama, Yokohama (JP)

(73) Assignees: Kabushiki Kaisha Toshiba, Tokyo (JP); Toshiba TEC Kabushiki Kaisha, Tokyo (JP)

( * ) Notice: Subject to any disclaimer, the term of this patent is extended or adjusted under 35 U.S.C. 154(b) by 1046 days.

(21) Appl. No.: 10/054,953

(22) Filed: Jan. 25, 2002

(65) Prior Publication Data

US 2003/0142355 A1 Jul. 31, 2003

(51) Int. Cl.
- *H04N 1/409* (2006.01)
- *H04N 1/58* (2006.01)
- *G06T 5/20* (2006.01)
- *G06K 9/34* (2006.01)

(52) U.S. Cl. ............. 358/2.1; 358/3.27; 358/532; 358/462; 382/173; 382/261; 382/266

(58) Field of Classification Search .......... 358/1.9, 358/2.1, 3.24, 3.26, 3.27, 532, 447, 462, 358/463; 382/260, 261, 263, 266, 269, 254, 382/173, 176, 275

See application file for complete search history.

(56) References Cited

U.S. PATENT DOCUMENTS 5,524,162 A * 6/1996 Levien ................. 382/263  
2003/0184775 A1 * 10/2003 Hirayama .............. 358/1.9

FOREIGN PATENT DOCUMENTS

| JP | 2000-333003 | 11/2000 |
| JP | 2002369071 A | * 12/2002 |
| JP | 2005142891 A | * 6/2005 |

OTHER PUBLICATIONS

U.S. Appl. No. 09/922,733, filed Aug. 7, 2001, Hirayama.

* cited by examiner

*Primary Examiner*—Scott A. Rogers  
(74) *Attorney, Agent, or Firm*—Foley & Lardner LLP

(57) ABSTRACT

A main CPU calculates filter coefficient values corresponding to area discrimination signals on the basis of an input sharpness adjustment value and original mode and a base filter coefficient set and a difference filter coefficient set stored in a ROM, and performs a filtering process by selecting a filter coefficient value in accordance with an area discrimination signal of a pixel of interest in input image data.

10 Claims, 6 Drawing Sheets

IMAGE PROCESSING METHOD AND IMAGE FORMING APPARATUS

BACKGROUND OF THE INVENTION

The present invention relates to an image processing method and an image forming apparatus, such as a digital copying machine, for reading an image on a color original by image reading means such as a color scanner, processing the read image data, and forming an image by means of a printer.

In the prior art, input image data is subjected to a filtering process to control the degree of sharpness.

When the sharpness is controlled and it is desired to vary the degree of sharpness among plural areas such as character areas/photo areas, this desire can be satisfied by adopting a structure permitting setting of the degree of sharpness in the respective areas.

However, since the degree of freedom in setting the filtering process is high, a plurality of control codes need to be treated and a great deal of time is consumed for the control.

For example, when the copy mode (standard, character, photo, etc.) is selected according to the kind of originals, if priority is put on characters in the original mode, the sharpness of the character area is enhanced. If priority is put on a photo area, a control has to be executed to prevent moire from occurring in the photo area.

BRIEF SUMMARY OF THE INVENTION

The object of the present invention is to provide an image processing method and an image forming apparatus capable of achieving a high image quality by performing a suitable filtering process for respective image data areas.

In order to achieve the object, the present invention provides an image forming apparatus which reads a color image on an original and subjects the read image data to image processing, thus forming a color image, the apparatus comprising: a storage section which prestores a first filter coefficient set and a second filter coefficient set; a setting section which presets a sharpness adjustment code value in the image processing; a mode select section which selects an original mode; an instruction section which instructs start of an image forming operation in the image forming apparatus; a reading section which reads the color image on the original when the instruction section has issued a start instruction; an area discrimination section which discriminates an area of each of pixels of interest in the color image data read by the reading section; a calculation section which calculates, when the instruction section has issued the start instruction, filter coefficient values associated with areas discriminated by the area discrimination section, on the basis of the first filter coefficient set and second filter coefficient set stored in the storage section, the sharpness adjustment code value set by the setting section, and the original mode selected by the select section; a temporary storage section which temporarily stores the plural filter coefficient values calculated by the calculation section; a selection section which selects one of the plural filter coefficient values temporarily stored in the temporary storage section, on the basis of an area discrimination result of the area discrimination section; and a process section which performs a filtering process for the image data, using the filter coefficient value selected by the selection section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
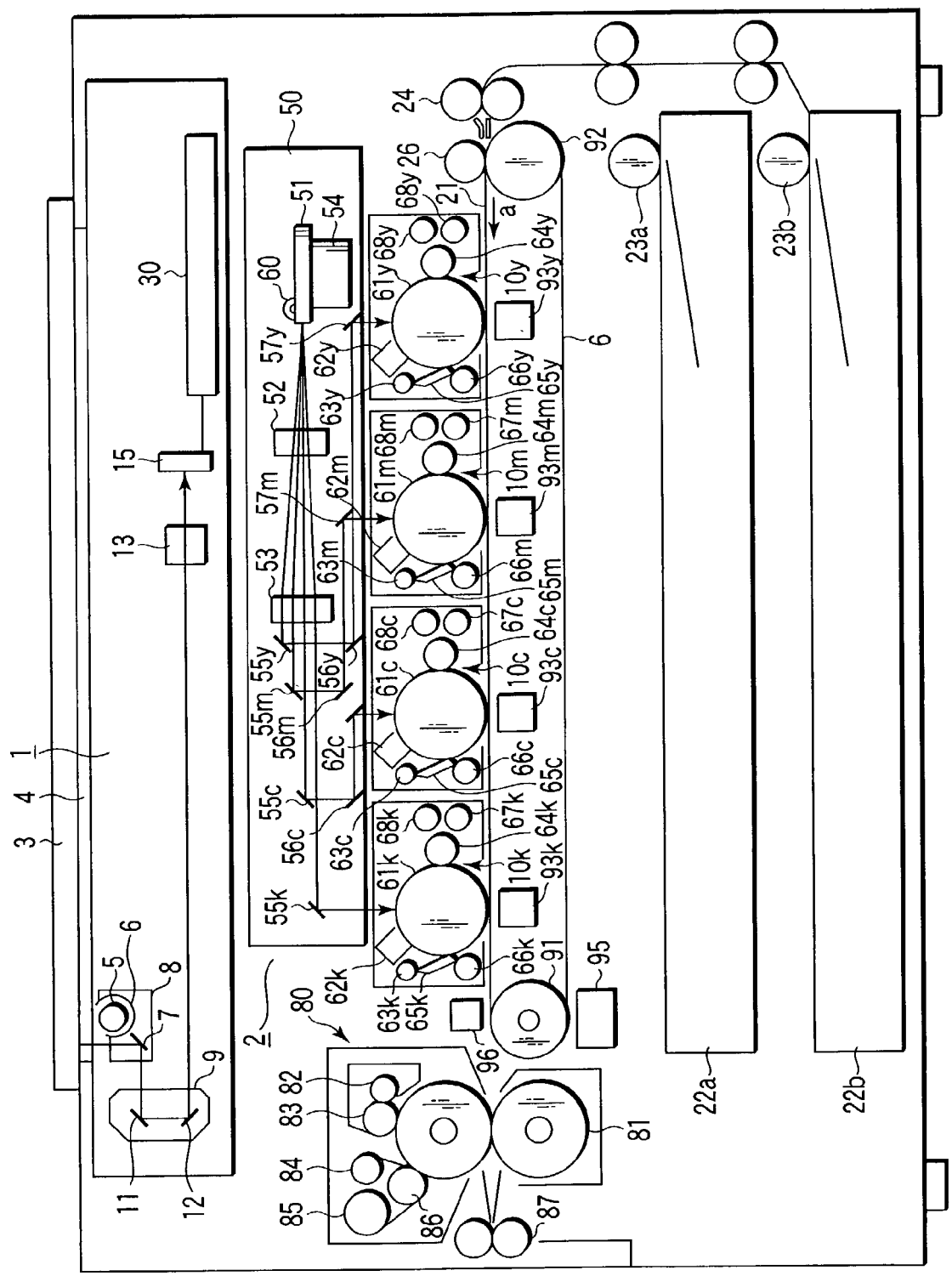
FIG. 1 schematically shows an internal structure of a digital color copying machine according to an image forming apparatus of the present invention.

FIG. 1 schematically shows an internal structure of a digital color copying machine according to an image forming apparatus of the present invention. In general terms, the digital color copying machine comprises a color scanner section 1 serving as image reading means for reading a color image on an original, and a color printer section 2 serving as image forming means for forming a copy image of the read color image.

The color scanner section 1 has an original table cover 3 on its upper part, and an original table 4 formed of transparent glass and disposed to face the original table cover 3 in the closed state. An original is placed on the original table 4. Below the original table 4, there are provided an exposure lamp 5 for illuminating the original placed on the original table 4; a reflector 6 for converging light from the exposure lamp 5 onto the original; and a first mirror 7 for deflecting the reflection light from the original to the left in the Figure. The exposure lamp 5, reflector 6 and first mirror 7 are fixed to a first carriage 8. The first carriage 8 is driven by a pulse motor (not shown) by means of a toothed belt (not shown), etc. so that the first carriage 8 may be moved in parallel along the lower surface of the original table 4.

A second carriage 9 is disposed on the left side (in the Figure) of the first carriage 8, that is, on the side to which reflection light from the first mirror 7 is guided. The second carriage 9 is movable in parallel to the original table 4 by means of a drive mechanism (not shown) (e.g. a toothed belt and a DC motor). The second carriage 9 comprises a second mirror 11 for downwardly (in the Figure) deflecting the reflection light from the original which has been guided by the first mirror 7, and a third mirror 12 for deflecting the reflection from the second mirror 11 to the right in the Figure. The second mirror 11 and third mirror 12 are disposed at right angles to each other. The second carriage 9 follows the movement of the first carriage 8 and moves in parallel to the original table 4 at a speed equal to half the speed of the first carriage 8.

A focusing lens 13 for focusing the reflection light from the third mirror 12 at a predetermined magnification is disposed in a plane including an optical axis of the light deflected by the second and third mirrors 11 and 12. A CCD color image sensor (photoelectric conversion element) 15 for converting the reflection light converged by the focusing lens 13 to an electric signal is disposed in a plane substantially perpendicular to the optical axis of the light traveling through the focusing lens 13. An output from the CCD color image sensor 15 is delivered to a main control section 30.

If light from the exposure lamp 5 is converged onto the original placed on the original table 4 by means of the reflector 6, the reflection light from the original is made incident on the color image sensor 15 via the first mirror 7, second mirror 11, third mirror 12 and focusing lens 13. The color image sensor 15 converts the incident light to electric signals of the three primary colors, R (red), G (green) and B (blue).

The color printer section 2 has first to fourth image forming units $10y$, $10m$, $10c$ and $10k$ for producing images of four colors, yellow (Y), magenta (M), cyan (C) and black (K), which are color-separated according to a well-known subtractive color mixing process.

A convey mechanism 20 is disposed below the image forming units $10y$, $10m$, $10c$ and $10k$. The convey mechanism 20 includes a convey belt 21 serving as convey means for conveying color images produced by the respective image forming units in a direction indicated by an arrow a. The convey belt 21 is passed between a driving roller 91 rotated by a motor (not shown) in the direction of arrow a and a driven roller 92 disposed apart from the driving roller 91 by a predetermined distance. The convey belt 21 is endlessly run in the direction of arrow a at a fixed speed. The image forming units $10y$, $10m$, $10c$ and $10k$ are arranged in tandem in the direction of conveyance of the convey belt 21.

Each of the image forming unit $10y$, $10m$, $10c$ and $10k$ includes a photosensitive drum $61y$, $61m$, $61c$, $61k$ serving as an image carrying body. The photosensitive drums $61y$, $61m$, $61c$ and $61k$ have outer peripheral surfaces which are rotatable in the same direction at points of contact with the convey belt 21. The photosensitive drums $61y$, $61m$, $61c$ and $61k$ are rotated by a motor (not shown) at a predetermined speed.

The photosensitive drums $61y$, $61m$, $61c$ and $61k$ are disposed to have their axes arranged at regular intervals from one another and in a direction perpendicular to the direction in which images are conveyed by the convey belt 21. In the description below, assume that the axial direction of each photosensitive drum $61y$, $61m$, $61c$, $61k$ is referred to as a main scan direction (second direction), and the rotational direction of each photosensitive drum $61y$, $61m$, $61c$, $61k$, that is, the direction of running of the convey belt 21 (the direction of arrow a), is referred to as a sub-scan direction (first direction).

Around each of the photosensitive drum $61y$, $61m$, $61c$ and $61k$, the following elements are disposed in order in the rotational direction: a charging device $62y$, $62m$, $62c$, $62k$ serving as charging means, extended in the main scan direction; a destaticizer $63y$, $63m$, $63c$, $63k$; a developing roller $64y$, $64m$, $64c$, $64k$ serving as developing means, similarly extended in the main scan direction; a lower stirring roller $67y$, $67m$, $67c$, $67k$; an upper stirring roller $68y$, $68m$, $68c$, $68k$; a transfer device $93y$, $93m$, $93c$, $93k$ serving as transfer means, similarly extended in the main scan direction; a cleaning blade $65y$, $65m$, $65c$, $65k$ similarly extended in the main scan direction; and a waste toner recovering screw $66y$, $66m$, $66c$, $66k$.

Each transfer device $93y$, $93m$, $93c$, $93k$ is disposed at such a position as to sandwich the convey belt 21 between itself and the photosensitive drum $61y$, $61m$, $61c$, $61k$, that is, inside the convey belt 21. In addition, an exposure point by an exposure device 50 (to be described later) is formed on that portion of the outer peripheral surface of each photosensitive drum $61y$, $61m$, $61c$, $61k$, which lies between the charging device $62y$, $62m$, $62c$, $62k$ and the developing roller $64y$, $64m$, $64c$, $64k$.

Sheet cassettes $22a$, $22b$ containing paper sheets P as image formation media, on which images formed by the image forming units $10y$, $10m$, $10c$, $10k$ are to be transferred, are disposed below the convey mechanism 20.

A pick-up roller $23a$, $23b$ is disposed at one end of each of the sheet cassettes $22a$, $22b$ and on a side close to the driven roller 92. The pick-up roller $23a$, $23b$ picks up sheets P one by one from the uppermost one from the sheet cassette $22a$, $22b$. Register rollers 24 are disposed between the pickup rollers $23a$, $23b$ and the driven roller 92. The register rollers 24 register and align a leading edge of the sheet P picked up from the sheet cassette $22a$, $22b$ with a leading edge of a y-toner image formed on the photosensitive drum $61y$ of the image forming unit $10y$.

Toner images formed on the other photosensitive drums $61m$, $61c$ and $61k$ are brought to respective transfer positions in accordance with the transfer timing of the sheet P conveyed on the convey belt 21.

An attraction roller 26 for providing an electrostatic attraction force to the sheet P conveyed at the predetermined timing via the register rollers 24 is disposed between the register rollers 24 and the first image forming unit $10y$, and near the driven roller 92, that is, substantially over the outer peripheral surface of the driven roller 92 with the convey belt 21 interposed. The axis of the attraction roller 26 and the axis of the driven roller 92 are set to be parallel to each other.

A position error sensor 96 for sensing a position of the image formed on the sheet P on the convey belt 21 is disposed in a region at one end of the convey belt 21, and near the driving roller 91, that is, substantially over the outer peripheral surface of the driving roller 91 with the convey belt 21 interposed. The position error sensor 96 comprises, for example, a light transmission type or a light reflection type optical sensor.

A convey belt cleaning device 95 for removing toner adhering to the convey belt 21 or paper dust of the sheet P is disposed at the outer peripheral surface of the driving roller 91, in contact with the convey belt 21 on the downstream side of the position error sensor 96.

A fixing device 80 is disposed in a region to which the sheet P conveyed by the convey belt 21 and separated from the driving roller 91 is delivered. The fixing device 80 heats the sheet P at a predetermined temperature, melts the toner image transferred on the sheet P, and fixes the toner image on the sheet P. The fixing device 80 comprises a heat roller pair 81, oil apply rollers 82 and 83, a web winding roller 84, a web roller 85, and a web press roller 86. The toner on the sheet P is fixed and the sheet P with the fixed toner image is discharged by a discharge roller pair 87.

The exposure device 50 forms color-separated electrostatic latent images on outer peripheral surfaces of the respective photosensitive drums 61y, 61m, 61c and 61k. The exposure device 50 has a semiconductor laser 60. The light emission from the semiconductor laser 60 is controlled on the basis of image data (y, m, c, k) of respective colors separated by an image processing apparatus 63 (to be described below). A polygon mirror 51 rotated by a polygon motor 54 to reflect and scan laser beams and fθ lenses 52 and 53 for focusing the laser beams reflected by the polygon mirror 51 by correcting their focal points are disposed in the named order along the optical path of the semiconductor laser 60.

First deflection mirrors 55y, 55m, 55c and 55k for deflecting the respective color laser beams emanating from the fθ lens 53 toward the exposure points on the photosensitive drums 61y, 61m, 61c and 61k, and second and third deflection mirrors 56y, 56m, 56c, 57y, 57m and 57c for further deflecting the laser beams deflected by the first deflection mirrors 55y, 55m and 55c are disposed between the fθ lens 53 and the photosensitive drums 61y, 61m, 61c and 61k.

The laser beam for black is deflected by the first deflection mirror 55k and then directly guided to the photosensitive drum 61k without intervention of other mirrors.

Figure 2:
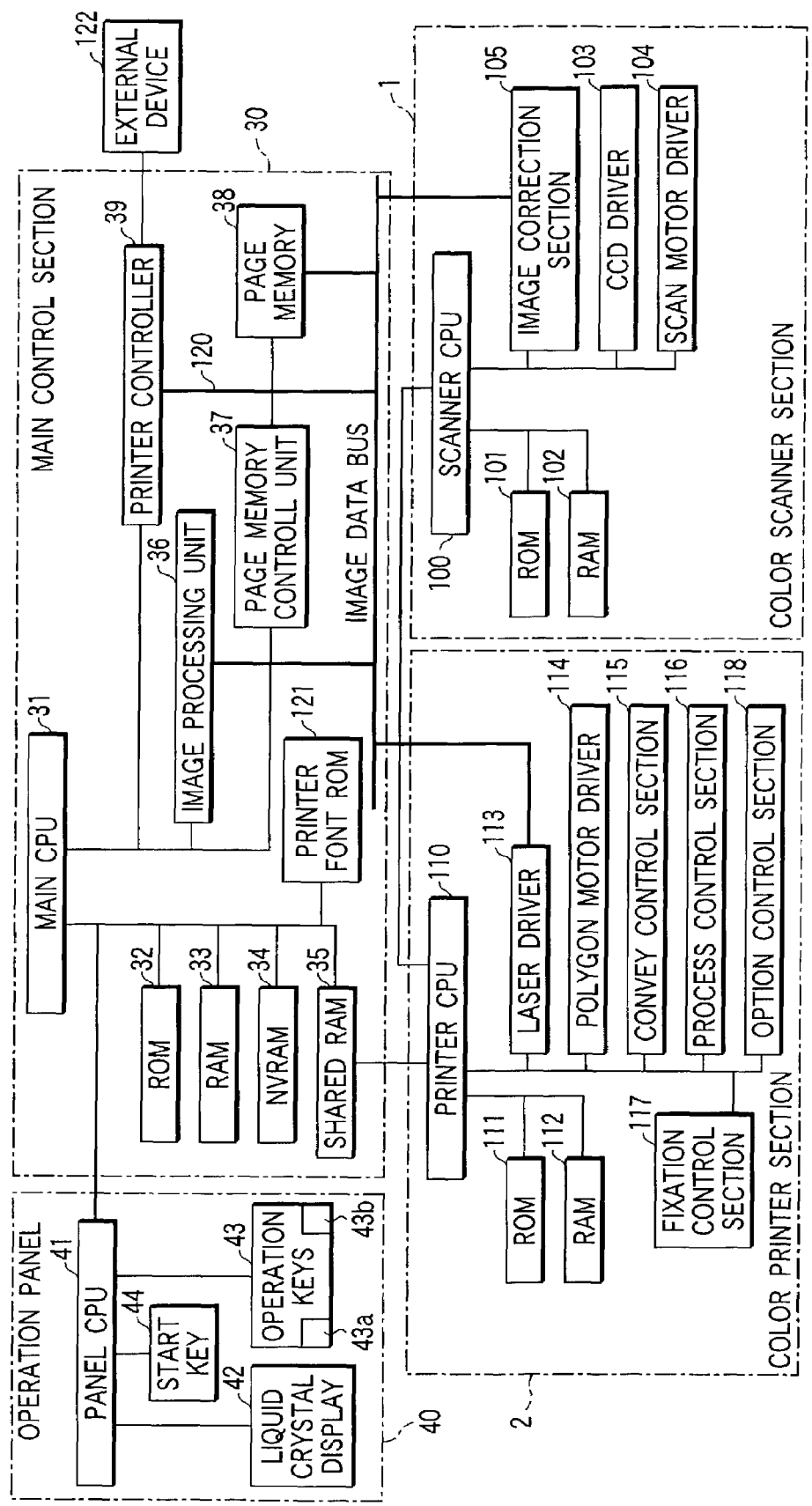
FIG. 2 is a block diagram schematically illustrating electrical connection in the digital color copying machine, and a flow of signals for control.

FIG. 2 is a block diagram schematically showing electrical connection of the digital color copying machine shown in FIG. 1 and flow of signals for control. In FIG. 2, a control system comprises three CPUs (Central Processing Units): a main CPU 31 provided in a main control section 30; a scanner CPU 100 in the color scanner section 1; and a color printer CPU 110 in the color printer section 2.

The main CPU 31 performs bi-directional communication with the printer CPU 110 via a shared RAM (Random Access Memory) 35. The main CPU 31 issues an operational instruction, and the printer CPU 110 returns status data. Serial communication is performed between the printer CPU 110 and scanner CPU 100. The printer CPU 110 issues an operational instruction, and the scanner CPU 100 returns status data.

An operation panel 40 comprises a liquid crystal display 42, various operation keys 43 including a sharpness control key 43a and an original mode select key 43b, a start key 44, and a panel CPU 41 to which these are connected. The operation panel 40 is connected to the main CPU 31.

The sharpness control key 43a is a key for adjusting the degree of sharpness in several steps (from "High" to "Low").

The original mode select key 43b is a key for selecting one of a standard mode, a character mode and a photo mode. The character mode is suitable for copying an original on which only characters (or characters/lines) appear. The photo mode is suitable for copying a monochromatic photo, a color photo, a photogravure, etc. Normally, the standard mode is selected and ordinary originals are copied in this mode.

The start key 44 is a key to be depressed to start a copying operation.

The main control section 30 comprises the main CPU 31, a ROM (Read-Only Memory) 32, a RAM 33, an NVRAM 34, shared RAM 35, image processing unit 36, a page memory control unit 37, a page memory 38, a printer controller 39, and a printer font ROM 121.

The main CPU 31 controls the entirety of the main control section 30. As will be described later in detail, the main CPU 31 includes a plurality of filter coefficient table registers, and switches filter coefficient tables.

The ROM 32 stores control programs, etc. As will be described later in detail, the ROM 32 stores a base filter coefficient set and a difference filter coefficient set prepared for a filtering process.

The RAM 33 temporarily stores data.

The NVRAM (Non-Volatile RAM) 34 is a non-volatile memory backed up by a battery (not shown), and even when power is not supplied, stored data is maintained.

The shared RAM 35 is used to perform bi-directional communication between the main CPU 31 and printer CPU 110.

The page memory control unit 37 stores and read out image information in and from the page memory 38. The page memory 38 has areas capable of storing image information of a plurality of pages. The page memory 38 can store compressed data in units of a page, which is obtained by compressing image information from the color scanner section 1.

The printer font ROM 121 stores font data corresponding to print data. The printer controller 39 develops print data, which is sent from an external device 122 such as a personal computer, into image data using the font data stored in the printer font ROM 121 with a resolution corresponding to resolution data added to the print data.

The color scanner section 1 comprises the scanner CPU 100 for controlling the entirety of the color scanner section 1; a ROM 101 storing control programs, etc.; a data storage RAM 102; a CCD driver 103 for driving the color image sensor 15; a scan motor driver 104 for controlling the rotation of a scan motor for moving the first carriage 8, etc.; and an image correction section 105.

The image correction section 105 comprises an A/D converter for converting RGB analog signals output from the color image sensor 15 to digital signals; a shading correction circuit for correcting a variance in the color image sensor 15 or a variation in threshold level due to ambient temperature variation relative to the output signal from the color image sensor 15; and a line memory for temporarily storing shading-corrected digital signals from the shading correction circuit.

The color printer section 2 comprises the printer CPU 110 for controlling the entirety of the color printer section 2; a ROM 111 storing control programs, etc.; a data storage RAM 112; a laser driver 113 for driving the semiconductor laser 60; a polygon motor driver 114 for driving the polygon motor 54 of the exposure device 50; a convey control section 115 for controlling conveyance of the sheet P by the convey mechanism 20; a process control section 116 for controlling charging, developing and transferring processes using the charging device, developing roller and transfer device; a fixation control section 117 for controlling the fixing device 80; and an option control section 118 for control options.

The image processing unit 36, page memory 38, printer controller 39, image correction section 105 and laser driver 113 are connected over an image data bus 120.

Figure 3:
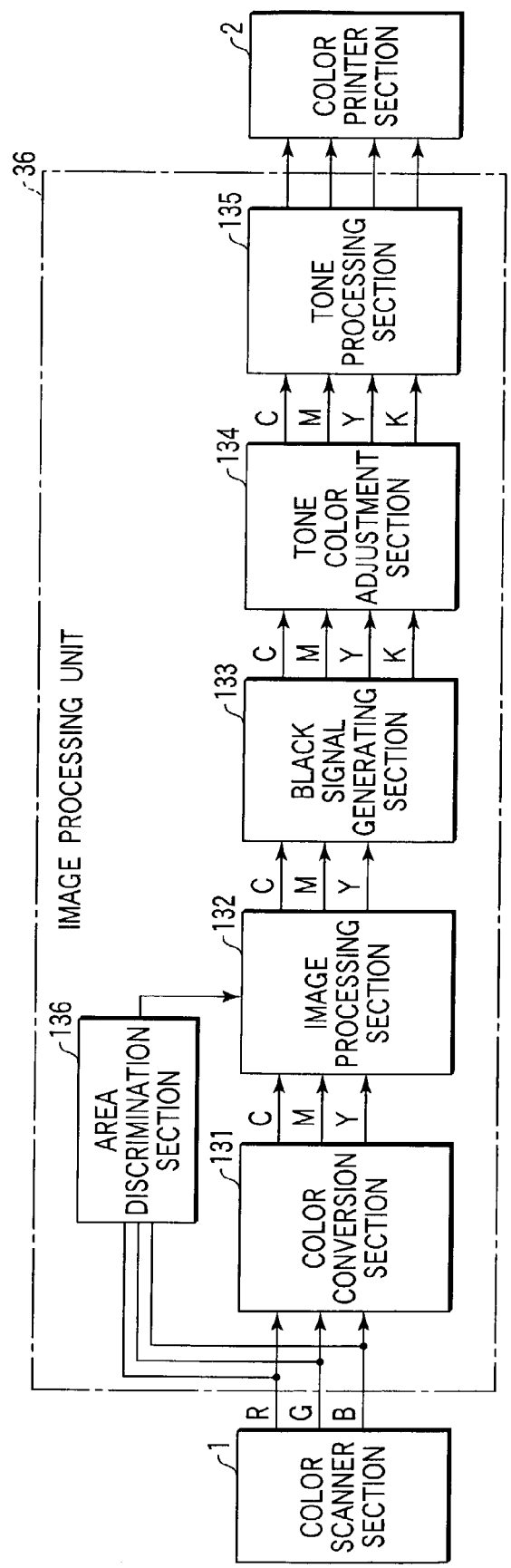
FIG. 3 is a block diagram schematically showing the structure of an image processing unit.

FIG. 3 schematically shows the structure of the image processing unit 36. In FIG. 3, image data R (red), G (green), B (blue) output from the color scanner section 1 is sent respectively to a color conversion section 131 in the image processing unit 36. The color conversion section 131 converts the input image data R, G, B to color signals of C (cyan), M (magenta) and Y (yellow). The color signals C, M and Y from the color conversion section 131 are sent to an image processing section 132. The image processing section 132 subjects the input color signals C, M and Y to various processings. Color signals C, M and Y output from the image processing section 132 are delivered respectively to a black signal generating section 133.

The black signal generating section 133 generates a signal of K (black) on the basis of the input color signals C, M and Y. Where color printing is effected, if three inks of C, M and Y are used, gray close to black is produced. In order to exactly print a black area as black pixels, the signal (K) for the black portion is produced. The signals of C, M, Y and K output from the black signal generating section 133 are sent to a tone color adjustment section 134.

The tone color adjustment section 134 corrects tones of the input CMYK signals. The CMYK signals output from the tone color adjustment section 134 are delivered to a tone processing section 135. The tone processing section 135 subjects the input CMYK signals to, for instance, an error spread method, in accordance with the number of recordable bits of the color printer section 2. Signals C, M, Y and K output from the tone processing section 135 are delivered to the color printer section 2.

The image data R, G, B output from the color scanner section 1 is also sent to an area discrimination section 136. Based on the input image data R, G, B, the area discrimination section 136 discriminates whether a pixel of interest belongs to a character or a photo, and to which original type it belongs. An area discrimination output signal 141 output from the area discrimination section 136 is delivered to the main CPU 31.

Figure 4:
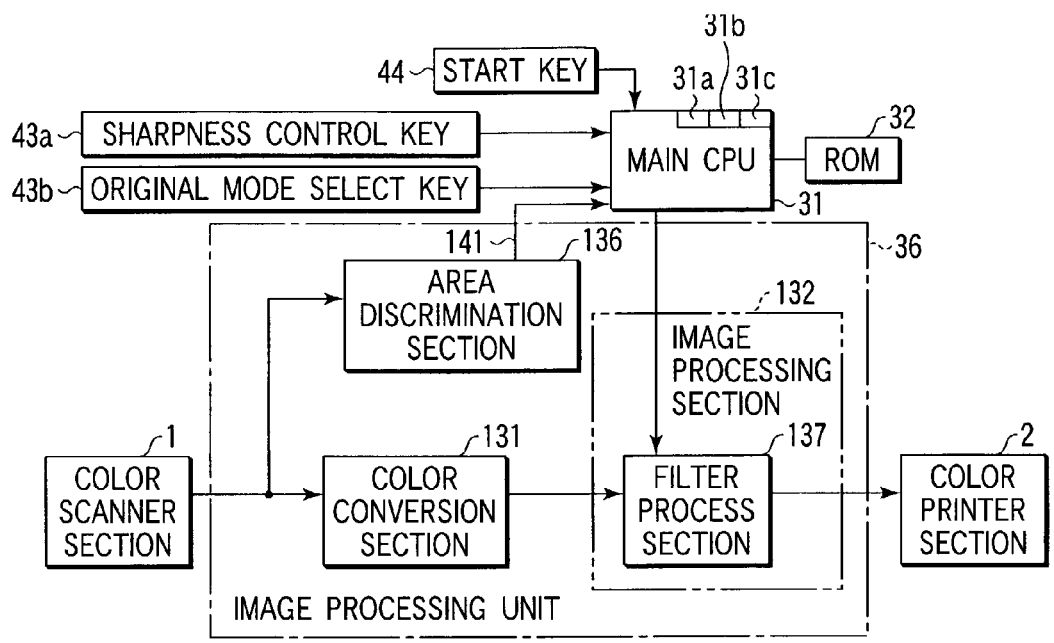
FIG. 4 is a block diagram schematically showing the structure of a main part of the image processing unit.

FIG. 4 schematically shows the structure of the main part of the invention. For simple description, FIG. 4 shows only the color conversion section 131, area discrimination section 136 and image processing section 132 as structural elements of the image processing unit 36.

To the main CPU 31, connected are the sharpness control key 43a, original mode select key 43b, start key 44 and ROM 32.

The main CPU 31 includes registers 31a to 31c for storing a plurality of filter coefficient tables (to be described later). The registers 31a to 31c store the associated filter coefficient tables. In this embodiment, the main CPU 31 includes three registers. The number of registers for storing filter coefficient tables can be increased, where necessary.

The image processing section 132 includes a filter process section 137.

The main CPU 31 sets a filter coefficient for the filter process section 137 in accordance with an area discrimination signal 141 from the area discrimination section 136.

Figure 5:
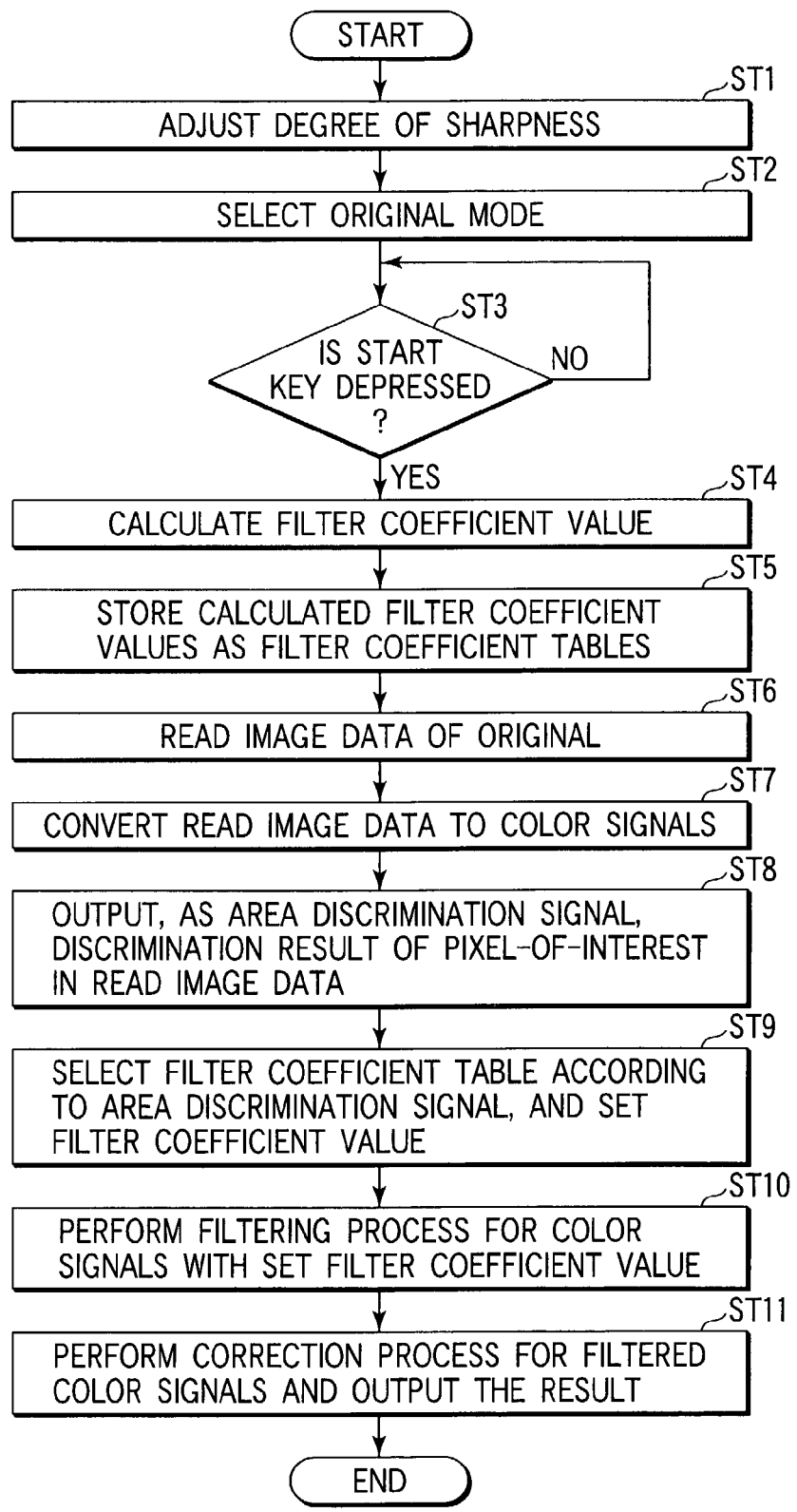
FIG. 5 is a flow chart illustrating a filtering process in the present invention.

The filtering process operation of this invention with the above-described structure will now be described with reference to a flow chart of FIG. 5.

The degree of sharpness is adjusted by the sharpness control key 43a (ST1), and the original mode is selected by the original mode select key 43b (ST2).

When the start key 44 has been depressed (ST3), the main CPU 31 calculates a filter coefficient value corresponding to the area discrimination signal 141 on the basis of the input sharpness adjustment value and original mode as well as the base filter coefficient set and difference filter coefficient set stored in the ROM 32 (ST4).

There is a case where the user wishes to increase or decrease the sharpness of an output image. In such a case, the user may operate the sharpness control key 43a to meet his/her demand.

Without the user's key operation, a serviceman may adjust the sharpness to a desired degree of sharpness as a default value.

In addition, there is a case that when an image can be divided into a plurality of areas such as a character area and a photo area, the user may wish to vary the sharpness in units of an area. In this case, the degree of freedom of adjustment can be increased if the apparatus is structured to permit the designer to set a sharpness adjustment code for each area. For this purpose, however, a great deal of time for adjustment is needed.

In the present invention, by contrast, the filtering intensity variation amounts for respective areas are correlated and thus the adjustment time is decreased.

In the prior art, a serviceman has controlled the sharpness using a plurality of codes. In this invention, with such correlation, only one code can be used for adjustment. Thereby, the serviceman's adjustment work can be simplified, and the time therefor reduced.

In this case, the decrease in the degree of freedom can be compensated by designing the ratio among the intensity variation amounts of respective areas in accordance with the original mode to be used (e.g. by increasing the variation amount ratio of a character area in the case of the original mode in which priority is put on characters).

To achieve this structure in the present invention, a filter coefficient value is calculated on the basis of the base filter coefficient set and difference filter coefficient set prestored in the ROM 32 for the filtering process.

Assume that the area discrimination section 136 discriminates an image into three areas: an area 1, an area 2 and an area 3 in a certain original mode.

The main CPU 31 first calculates a filter intensity adjustment amount "gain".

The following are calculation formulae for the filter intensity adjustment amount "gain":

$$gain_1 = SHPB \times rck_1$$

$$gain_2 = SHPB \times rck_2$$

$$gain_3 = SHPB \times rck_3$$

Wherein SHPB is a sharpness adjustment code value, and $rck_1$, $rck_2$, and $rck_3$ are gain variation values.

The sharpness adjustment code value SHPB is a sharpness adjustment code value adjusted by the serviceman and is common to the respective areas (1, 2, 3) divided by the area discrimination section 136.

The sharpness adjustment code value SHPB is preset by the serviceman. For example, the serviceman sets the sharpness adjustment code value SHPB as a serviceman set code using the liquid crystal display 42 and operation key 43.

By setting one sharpness adjustment code value in a certain original mode, the sharpness control for the three areas can be effected at the same time.

The ratio among the gain variation values $rck_1$, $rck_2$, and $rck_3$ are preset to be $rck_1:rck_2:rck_3=1:2:3$.

Area 1 is set at gain variation value $rck_1$, area 2 is set at gain variation value $rck_2$, and area 3 is set at gain variation value $rck_3$.

Figure 6:
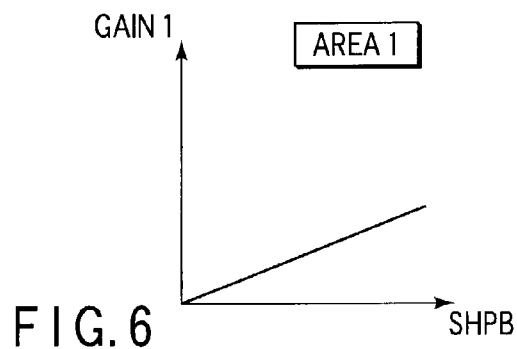
FIG. 6 shows a relationship between a gain and a SHPB in area 1.
Figure 7:
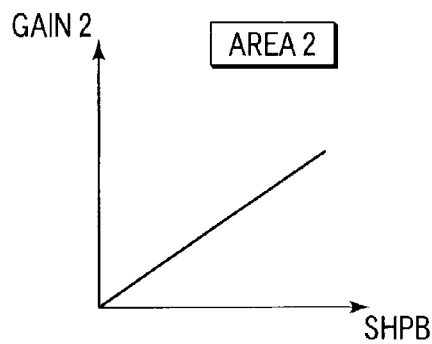
FIG. 7 shows a relationship between a gain and a SHPB in area 2.
Figure 8:
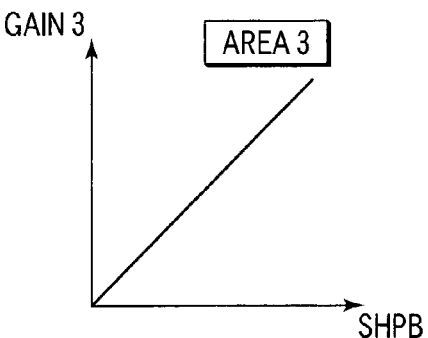
FIG. 8 shows a relationship between a gain and a SHPB in area 3.

FIGS. 6 to 8 show the relationships between the gain variation values $rck_1$, $rck_2$, and $rck_3$ set with the above ratio, and SHPB, in association with the respective areas.

FIG. 6 shows a relationship between $gain_1$ and SHPB in area 1.

FIG. 7 shows a relationship between $gain_2$ and SHPB in area 2.

FIG. 8 shows a relationship between $gain_3$ and SHPB in area 3.

The $gain_1$, $gain_2$ and $gain_3$ correspond to the sharpness intensity variation amounts in the respective areas.

Subsequently, the main CPU 31 calculates filter coefficient values.

The following are calculation formulae for filter coefficients FLT[i]:

$$FLT_1[i]=FB_1[i]+gain_1 \times (FD_1[i]-FB_1[i])$$

$$FLT_2[i]=FB_2[i]+gain_2 \times (FD_2[i]-FB_2[i])$$

$$FLT_3[i]=FB_3[i]+gain_3 \times (FD_3[i]-FB_3[i])$$

wherein i is a serial number of the filter coefficient.

$FB_1[i]$, $FB_2[i]$ and $FB_3[i]$ are base filter coefficients and are determined by the original mode and area discrimination signal.

$FD_1[i]$, $FD_2[i]$ and $FD_3[i]$ are difference filter coefficients and are determined by the original mode and area discrimination signal.

Based on the above formulae, the main CPU 31 calculates the filter coefficients to be set for the respective areas, and registers the calculated three filter coefficient values in the registers 31a to 31c in the form of filter coefficient tables.

Figure 9:
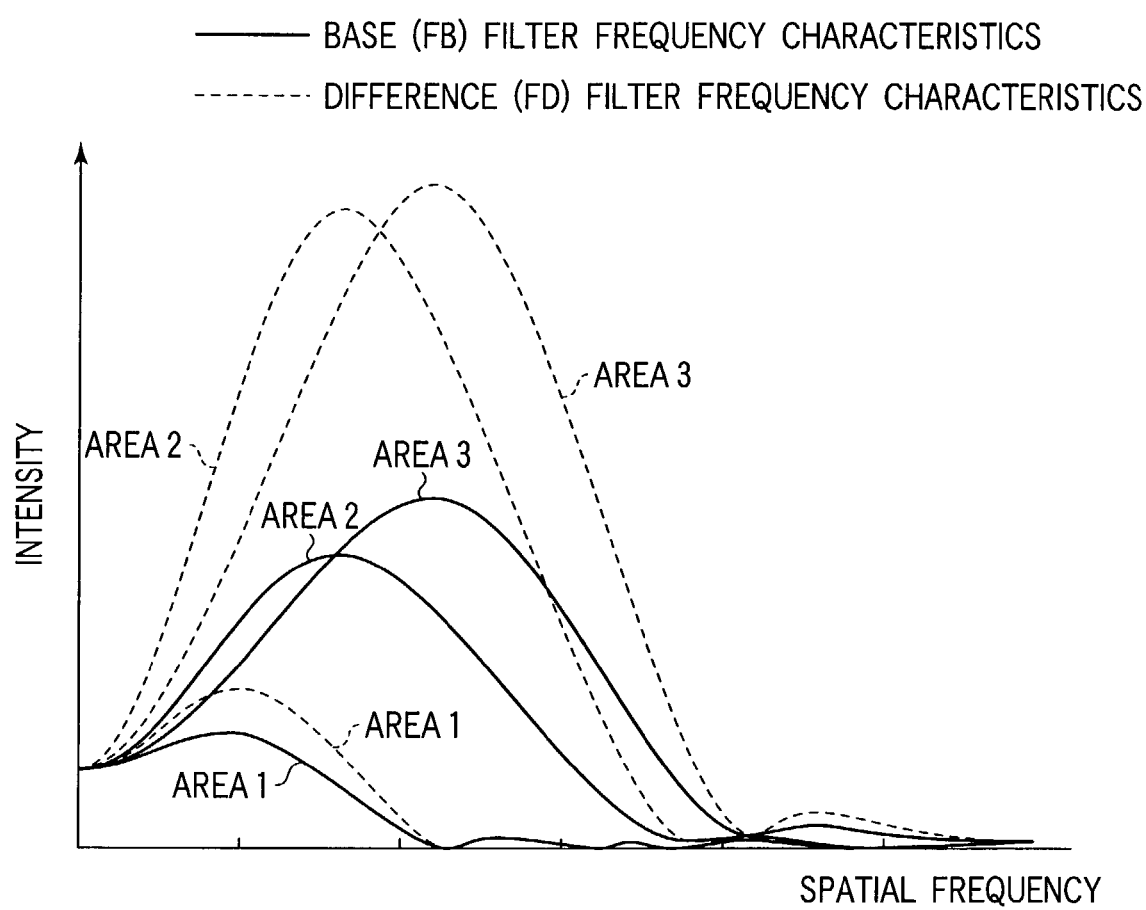
FIG. 9 shows frequency characteristics of pairs of base filters and difference filters selected for respective areas.

FIG. 9 shows frequency characteristics (spatial frequencies) of base filters and difference filters selected for respective areas shown in FIGS. 6 to 8.

FIG. 9 shows base filter (FB) frequency characteristics in solid lines and difference frequency (FD) frequency characteristics in broken lines in areas 1, 2 and 3.

As is shown in FIG. 9, the apparatus is designed such that the curves of paired base filter and difference filter frequency characteristics associated with each area are substantially equal and are different only in intensity (i.e. the frequency at peak is equal but the intensity is different).

Accordingly, such filter coefficient can be calculated, that the intensity is varied without varying frequency response shapes. Thus, without storing excess filter coefficient tables in the ROM 32, the filter coefficient values with varied intensity can be set.

For example, if the area discrimination section 136 discriminates an image into three areas, three filter coefficient tables corresponding to the area discrimination signal 141 are prepared.

The filter coefficient value calculated in this case is associated with filtering of 7×7 pixels in respect of a pixel of interest.

The main CPU 31 stores the calculated filter coefficient values in the registers 31a to 31c in the form of filter coefficient tables (ST5).

Subsequently, the main CPU 31 reads image data of the original from the color scanner section 1 (ST6).

The image data, R, G, B, read by the color scanner section 1 is input to the image processing unit 36.

The color conversion section 131 converts the image data, R, G, B, which has been input to the image processing apparatus 36, to CMY color signals and delivers them to the filter process section 137 in the image processing section 132 (ST7).

At the same time, the area discrimination section 136 outputs to the main CPU 31 the area discrimination signal 141 that represents a discrimination result as to whether a pixel of interest in the image data, R, G, B, input to the image processing unit 36 is associated with a part of a character or a part of a photo, or a discrimination result as to the original type of the area to which the pixel of interest belongs (ST8). The method of discrimination is a conventional one, and a detailed description thereof is omitted.

The main CPU 31 selects one of the filter coefficient tables (filter coefficient values) stored in the registers 31a to 31c in accordance with the input area discrimination signal 141, and sets the selected one in the filter process section 137 (ST9).

Using the filter coefficient values set in the main CPU 31, the filter process section 137 performs the filtering process for the CMY color signals input from the color conversion section 131 (ST10).

A high image quality can be realized by switching the filter coefficient values to optimal ones in accordance with the area of the image (the area discrimination signal).

The CMY color signals filtered by the filter process section 137 is successively delivered to the black signal generating section 133, tone color adjustment section 134 and tone processing section 135. The resultant signal is output to the color printer section 2 as a printer output signal (ST11).

According to the present embodiment, the divided areas of an image are processed using different filter coefficient values. Specifically, when an image has been discriminated into, e.g. a character area and a photo area, the character area is filtered to have a higher sharpness than the photo area.

In addition, the sharpness variation amount associated with the sharpness control key 43a can be adjusted (e.g. by the serviceman). Thus, the sharpness can be adjusted (with a default value) without the key operation. Specifically, in each original mode, the sharpness can be adjusted by one sharpness adjustment code value SHPB. By adjusting this code value, the sharpness can be controlled at the same time for the divided areas in the original mode.

The filter coefficient sets stored in the ROM 32 are classified into the base filter coefficient set and the difference filter coefficient set.

When the main CPU 31 writes filter coefficient tables in the registers, the main CPU 31 calculates filter coefficient values with varied degrees of sharpness on the basis of the sharpness adjustment values and original mode, using the base filter coefficient set and difference filter coefficient set stored in the ROM 32.

The main CPU 31 includes the registers for storing the filter coefficient tables, and switches the to-be-used filter coefficient table in accordance with the area discrimination signal 141.

As has been described above, according to the embodiment of the invention, the parameters that determine the filter intensity variation amounts of respective image areas are correlated. Thereby, the variation amount of each area can be determined only by varying the single adjustment code.

The correlation among the parameters in this context means, for example, that the variation amount of the character area is increased by a predetermined number of times, compared to the photo area, in the original mode in which priority is put on characters.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus which reads a color image on an original and subjects the read image data to image processing, thus forming a color image, the apparatus comprising:
   a storage section which prestores a first filter coefficient set and a second filter coefficient set;
   a setting section which presets a sharpness adjustment code value in the image processing;
   a mode select section which selects an original mode;
   an instruction section which instructs start of an image forming operation in the image forming apparatus;
   a reading section which reads the color image on the original when the instruction section has issued a start instruction;
   an area discrimination section which discriminates an area of each of pixels of interest in the color image data read by the reading section;
   a calculation section which calculates, when the instruction section has issued the start instruction, filter coefficient values associated with areas discriminated by the area discrimination section, on the basis of the first filter coefficient set and second filter coefficient set stored in the storage section, the sharpness adjustment code value set by the setting section, and the original mode selected by the select section;
   a temporary storage section which temporarily stores the plural filter coefficient values calculated by the calculation section;
   a selection section which selects one of the plural filter coefficient values temporarily stored in the temporary storage section, on the basis of an area discrimination result of the area discrimination section; and
   a process section which performs a filtering process for the image data, using the filter coefficient value selected by the selection section.

2. An image forming apparatus according to claim 1, wherein the first filter coefficient set stored in the storage section is a base filter coefficient set, and the second filter coefficient set is a difference filter coefficient set.

3. An image forming apparatus according to claim 1, wherein the setting section is preset by a serviceman of the image forming apparatus.

4. An image forming apparatus according to claim 1, wherein the sharpness adjustment code value set by the setting section is commonly used for the respective areas discriminated by the area discrimination section.

5. An image forming apparatus according to claim 1, wherein the sharpness adjustment code value set by the setting section is set specifically for each of respective original modes, which is selected by the mode select section.

6. An image forming apparatus according to claim 1, wherein the sharpness adjustment code value set by the setting section is set specifically for each of respective original modes, which is selected by the mode select section, and is commonly used for the respective areas discriminated by the area discrimination section.

7. An image forming apparatus according to claim 1, wherein when the calculation section calculates the filter coefficient values corresponding to the areas discriminated by the area discrimination section, a predetermined ratio is preset among the coefficients corresponding to the areas discriminated by the area discrimination section.

8. An image forming apparatus which reads a color image on an original and subjects the read image data to image processing, thus forming a color image, the apparatus comprising:
   a storage section which prestores a first filter coefficient set and a second filter coefficient set;
   a setting section which presets a sharpness adjustment code value in the image processing;
   an adjustment section which adjusts the sharpness adjustment code value set by the setting section;
   a mode select section which selects an original mode;
   an instruction section which instructs start of an image forming operation in the image forming apparatus;
   a reading section which reads the color image on the original when the instruction section has issued a start instruction;
   a conversion section which converts the color image data read by the reading section to color signals;
   an area discrimination section which discriminates an area of each of pixels of interest in the color image data read by the reading section;
   a calculation section which calculates, when the instruction section has issued the start instruction, filter coefficient values associated with areas discriminated by the area discrimination section, on the basis of the first filter coefficient set and second filter coefficient set stored in the storage section, the sharpness adjustment code value set by the setting section, the value adjusted by the adjustment section and the original mode selected by the select section;
   a temporary storage section which temporarily stores the plural filter coefficient values calculated by the calculation section;
   a selection section which selects one of the plural filter coefficient values temporarily stored in the temporary storage section, on the basis of an area discrimination result of the area discrimination section; and
   a process section which performs a filtering process for the color signals converted by the conversion section, using the filter coefficient value selected by the selection section.

9. An image forming apparatus according to claim 8, wherein when no adjustment has been effected by the adjustment section, the sharpness adjustment code value set by the setting section is used as a default for sharpness adjustment.

10. An image processing method which subjects supplied image data to image processing, comprising:
    prestoring a first filter coefficient set and a second filter coefficient set;
    presetting a sharpness adjustment code value in the image processing;
    selecting an original mode;
    discriminating an area of each of pixels of interest in the supplied image data;
    calculating filter coefficient values associated with the discriminated areas on the basis of the stored first filter coefficient set and second filter coefficient set corresponding to the selected original mode, and the set sharpness adjustment code value;
    temporarily storing the calculated filter coefficient values associated with the respective areas;
    selecting one of the temporarily stored plural filter coefficient values in accordance with a result of the discrimination of the areas; and
    performing a filtering process for the image data, using the selected filter coefficient value.

* * * * *